US00RE50309E

(19) United States
(12) Reissued Patent
Trachewsky et al.

(10) Patent Number: US RE50,309 E
(45) Date of Reissued Patent: *Feb. 18, 2025

(54) BACKWARD-COMPATIBLE LONG TRAINING SEQUENCES FOR WIRELESS COMMUNICATION NETWORKS

(71) Applicant: Bell Northern Research, LLC, Chicago, IL (US)

(72) Inventors: Jason Alexander Trachewsky, Menlo Park, CA (US); Rajendra T. Moorti, Mountain View, CA (US)

(73) Assignee: Bell Northern Research, LLC, Chicago, IL (US)

( * ) Notice: This patent is subject to a terminal disclaimer.

(21) Appl. No.: 18/118,514

(22) Filed: Mar. 7, 2023

Related U.S. Patent Documents

Reissue of:
(64) Patent No.: 7,990,842
Issued: Aug. 2, 2011
Appl. No.: 12/684,650
Filed: Jan. 8, 2010

U.S. Applications:
(63) Continuation of application No. 17/368,156, filed on Jul. 6, 2021, now Pat. No. Re. 49,509, which is a
(Continued)

(51) Int. Cl.
*H04L 27/26* (2006.01)
*H04L 5/00* (2006.01)
*H04L 25/02* (2006.01)

(52) U.S. Cl.
CPC ..... *H04L 27/2613* (2013.01); *H04L 27/262* (2013.01); *H04B 2201/70701* (2013.01);
(Continued)

(58) Field of Classification Search
CPC . H04L 27/2613; H04L 27/262; H04L 5/0048; H04L 25/0226; H04B 2201/70701; H04B 2201/70706
See application file for complete search history.

(56) References Cited

U.S. PATENT DOCUMENTS 5,479,444 A 12/1995 Malkamaki et al.
5,914,933 A 6/1999 Cimini et al.
(Continued)

FOREIGN PATENT DOCUMENTS

WO WO2004030265 A1 4/2004

OTHER PUBLICATIONS

"Part 11: Wireless LAN Medium Access Control (MAC) and Physical Layer (PHY) specifications: High-speed Physical Layer in the 5 GHZ Band," IEEE Std 802. 11a-1999 (Supplement to IEEE Std 802.11-1999), Dec. 30, 1999, pp. 1-90, IEEE, United States.
(Continued)

*Primary Examiner* — Mark Sager
(74) *Attorney, Agent, or Firm* — Mendelsohn Dunleavy, P.C.; Steve Mendelsohn

(57) ABSTRACT

A network device for generating an expanded long training sequence with a minimal peak-to-average ratio. The network device includes a signal generating circuit for generating the expanded long training sequence. The network device also includes an Inverse Fourier Transform for processing the expanded long training sequence from the signal generating circuit and producing an optimal expanded long training sequence with a minimal peak-to-average ratio. The expanded long training sequence and the optimal expanded long training sequence are stored on more than 52 subcarriers.

35 Claims, 5 Drawing Sheets

Related U.S. Application Data continuation of application No. 16/686,468, filed on Nov. 18, 2019, now Pat. No. Re. 48,629, which is an application for the reissue of Pat. No. 7,990,842, which is a continuation of application No. 11/188, 771, filed on Jul. 26, 2005, now Pat. No. 7,646,703.

(60) Provisional application No. 60/634,102, filed on Dec. 8, 2004, provisional application No. 60/591,104, filed on Jul. 27, 2004.

(52) U.S. Cl.
CPC .. *H04B 2201/70706* (2013.01); *H04L 5/0048* (2013.01); *H04L 25/0226* (2013.01)

(56) References Cited

U.S. PATENT DOCUMENTS

| | | | |
|---|---|---|---|
| 6,438,173 | B1 | 8/2002 | Stantchev |
| 6,696,941 | B2 | 2/2004 | Baker |
| 6,858,930 | B2 | 2/2005 | Miller et al. |
| 6,941,156 | B2 | 9/2005 | Mooney |
| 6,963,129 | B1 | 11/2005 | Evans et al. |
| 7,039,435 | B2 | 5/2006 | McDowell et al. |
| 7,203,245 | B1 | 4/2007 | Murphy |
| 7,254,171 | B2 | 8/2007 | Hudson |
| 7,318,185 | B2 | 1/2008 | Khandani et al. |
| 7,319,889 | B2 | 1/2008 | Goris et al. |
| 7,324,605 | B2 | 1/2008 | Maltsev et al. |
| 7,349,436 | B2 | 3/2008 | Maltsev et al. |
| 7,392,015 | B1 | 6/2008 | Farlow et al. |
| 7,394,865 | B2 | 7/2008 | Borran et al. |
| 7,433,418 | B1 | 10/2008 | Dogan et al. |
| 7,444,134 | B2 | 10/2008 | Hansen et al. |
| 7,453,793 | B1 | 11/2008 | Jones, IV et al. |
| 7,539,260 | B2 | 5/2009 | van Zelst et al. |
| 7,564,914 | B2 | 7/2009 | Hansen et al. |
| 7,599,332 | B2 | 10/2009 | Zelst et al. |
| 7,646,703 | B2 | 1/2010 | Trachewsky et al. |
| 7,742,388 | B2 | 6/2010 | Shearer et al. |
| 7,957,450 | B2 | 6/2011 | Hansen et al. |
| 7,990,842 | B2 | 8/2011 | Trachewsky et al. |
| 8,204,554 | B2 | 6/2012 | Goris et al. |
| 8,396,072 | B2 | 3/2013 | Jokinen et al. |
| 8,416,862 | B2 | 4/2013 | Aldana et al. |
| 8,457,232 | B2 | 6/2013 | van Zelst et al. |
| 8,477,594 | B2 | 7/2013 | Trachewsky et al. |
| 8,792,432 | B2 | 7/2014 | Martin et al. |
| RE48,629 | E * | 7/2021 | Trachewsky et al. |
| RE49,509 | E * | 4/2023 | Trachewsky et al. |
| 2003/0043887 | A1 | 3/2003 | Hudson |
| 2004/0008803 | A1 | 1/2004 | Aldrovandi et al. |
| 2004/0093545 | A1 | 5/2004 | Khandani et al. |
| 2004/0264585 | A1 | 12/2004 | Borran et al. |
| 2005/0233709 | A1 | 10/2005 | Gardner et al. |
| 2005/0265219 | A1 | 12/2005 | Murphy et al. |
| 2005/0286474 | A1 | 12/2005 | van Zelst et al. |
| 2006/0002361 | A1 | 1/2006 | Webster et al. |
| 2006/0120447 | A1 | 6/2006 | Trachewsky et al. |
| 2006/0209890 | A1 | 9/2006 | MacMullan et al. |
| 2006/0209892 | A1 | 9/2006 | MacMullan et al. |
| 2007/0002749 | A1 | 1/2007 | Sondur et al. |
| 2007/0047671 | A1 | 3/2007 | Chen |
| 2007/0060073 | A1 | 3/2007 | Boer et al. |
| 2010/0110876 | A1 | 5/2010 | Trachewsky et al. |

OTHER PUBLICATIONS

Ogawa, Yasutaka et al. "A MIMO-OFDM System for High-Speed Transmission," 2003 IEEE 58th Vehicular Technology Conference, Oct. 9, 2003, pp. 493-497, IEEE, Orland, United States.

Abhayawardhana, V. S. et al., "Frequency Scaled Time Domain Equalization for OFDM in Broadband Fixed Wireless Access Channels," 2002 IEEE Wireless Communications and Networking Conference Record, Mar. 21, 2002, pp. 67-72, IEEE, Orland, United States.

Liebetreu, John et al., "Modifications to OFDM FFT-256 mode for supporting mobile operation," IEEE C802.16e-03/12, Mar. 3, 2003, pp. 0-8, IEEE.

Decision: Settlement Prior to Institution of Trial; IPR 2019-01174; dated Dec. 11, 2019 (4 pages).

Decision: Settlement Prior to Institution of Trial; IPR 2019-01345; dated Dec. 11, 2019 (3 pages).

Decision: Settlement Prior to Institution of Trial; IPR 2019-01437; dated Dec. 11, 2019 (8 pages).

Order Granting Joint Motion for Dismissal as to Counts III and IV of BNR's Complaint and Partial Dismissal of Counts I and II of Coolpad's Counterclaims; C.A. No. 3:18-cv-1783-CAB-BLM; dated Oct. 7, 2019 (1 page).

Order Granting Joint Morion to Dismiss; Case No. 18-CV-1785-CAB-BLM; dated Aug. 5, 2019 (2 pages).

Order Granting Joint Motion for Dismissal as to Counts 3 and 6 of BNR's Amended Complaint and Counts VI, VII, X, and XI of ZTE Corporation, ZTE (TX), Inc., and ZTE (USA) Inc.'s Counterclaims; C.A. No. 3:18-cv-1786-CAB-BLM; dated Oct. 4, 2019 (1 page).

Order Granting Joint Motion for Dismissal as to Counts III and VI of BNR's Second Amended Complaint; C.A. No. 3:18-cv-1784-CAB-BLM; dated Oct. 21, 2019 (1 page).

* cited by examiner

| | | | | | | | | | | | | | |
|---|---|---|---|---|---|---|---|---|---|---|---|---|---|
| +1 | +1 | 1 | 1 | -1 | -1 | 1 | 1 | -1 | 1 | -1 | 1 | 1 | 1 |
| -28 | -27 | -26 | -25 | -24 | -23 | -22 | -21 | -20 | -19 | -18 | -17 | -16 | -15 |

Sub-carrier index

| | | | | | | | | | | | | | | |
|---|---|---|---|---|---|---|---|---|---|---|---|---|---|---|
| 1 | 1 | 1 | -1 | -1 | 1 | 1 | -1 | 1 | -1 | 1 | 1 | 1 | 1 | 0 |
| -14 | -13 | -12 | -11 | -10 | -9 | -8 | -7 | -6 | -5 | -4 | -3 | -2 | -1 | 0 |

Sub-carrier index

| | | | | | | | | | | | | | |
|---|---|---|---|---|---|---|---|---|---|---|---|---|---|
| +1 | -1 | -1 | 1 | 1 | -1 | 1 | -1 | 1 | -1 | -1 | -1 | -1 | -1 |
| 1 | 2 | 3 | 4 | 5 | 6 | 7 | 8 | 9 | 10 | 11 | 12 | 13 | 14 |

Sub-carrier index

| | | | | | | | | | | | | | |
|---|---|---|---|---|---|---|---|---|---|---|---|---|---|
| 1 | 1 | -1 | -1 | 1 | -1 | 1 | -1 | 1 | 1 | 1 | 1 | -1 | -1 |
| 15 | 16 | 17 | 18 | 19 | 20 | 21 | 22 | 23 | 24 | 25 | 26 | 27 | 28 |

Sub-carrier index

LONG TRAINING SEQUENCE FOR 56 ACTIVE
FIGURE 4

| | | | | | | | | | | | | | | | | | |
|---|---|---|---|---|---|---|---|---|---|---|---|---|---|---|---|---|---|
| -1 | -1 | +1 | +1 | +1 | +1 | 1 | 1 | -1 | -1 | 1 | 1 | -1 | 1 | -1 | 1 | 1 | 1 |
| -32 | -31 | -30 | -29 | -28 | -27 | -26 | -25 | -24 | -23 | -22 | -21 | -20 | -19 | -18 | -17 | -16 | -15 |

Sub-carrier index

| | | | | | | | | | | | | | | |
|---|---|---|---|---|---|---|---|---|---|---|---|---|---|---|
| 1 | 1 | 1 | -1 | -1 | 1 | 1 | -1 | 1 | -1 | 1 | 1 | 1 | 1 | 0 |
| -14 | -13 | -12 | -11 | -10 | -9 | -8 | -7 | -6 | -5 | -4 | -3 | -2 | -1 | 0 |

Sub-carrier index

| | | | | | | | | | | | | | |
|---|---|---|---|---|---|---|---|---|---|---|---|---|---|
| +1 | -1 | -1 | 1 | 1 | -1 | 1 | -1 | 1 | -1 | -1 | -1 | -1 | -1 |
| 1 | 2 | 3 | 4 | 5 | 6 | 7 | 8 | 9 | 10 | 11 | 12 | 13 | 14 |

Sub-carrier index

| | | | | | | | | | | | | | | | | |
|---|---|---|---|---|---|---|---|---|---|---|---|---|---|---|---|---|
| 1 | 1 | -1 | -1 | 1 | -1 | 1 | -1 | 1 | 1 | 1 | 1 | -1 | -1 | -1 | +1 | -1 |
| 15 | 16 | 17 | 18 | 19 | 20 | 21 | 22 | 23 | 24 | 25 | 26 | 27 | 28 | 29 | 30 | 31 |

Sub-carrier index

LONG TRAINING SEQUENCE FOR 63 ACTIVE
FIGURE 5

BACKWARD-COMPATIBLE LONG TRAINING SEQUENCES FOR WIRELESS COMMUNICATION NETWORKS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

*Notice: The following multiple reissue applications have been filed for the reissue of U.S. Pat. No. 7,990,842: (1) reissue application Ser. No. 16/686,468, filed Nov. 18, 2019 and reissued as U.S. Reissue Pat. No. RE48,629, (2) reissue application Ser. No. 17/368,156, filed Jul. 6, 2021, and (3) the present reissue application, which is a reissue continuation of Ser. No. 17/368,156.* The present application is *a reissue continuation application of reissue application Ser. No. 17/368,156, filed Jul. 6, 2021, which was a reissue continuation application of reissue application Ser. No. 16/686,468, filed Nov. 18, 2019, which was a reissue application for U.S. Pat. No. 7,990,842, which was* a CONTINUATION of U.S. application Ser. No. 11/188,771, filed Jul. 26, 2005 *and issued as U.S. Pat. No. 7,646,703*. Said U.S. application Ser. No. 11/188,771 makes reference to, claims priority to and claims benefit from U.S. Application No. 60/591,104, filed Jul. 27, 2004; and U.S. Application No. 60/634,102, filed on Dec. 8, 2004. The above-identified applications are hereby incorporated herein by reference in their entirety.

BACKGROUND OF THE INVENTION

1. Field of the Invention

The present invention relates generally to wireless communication systems and more particularly to long training sequences of minimum peak-to-average power ratio which may be used by legacy systems.

2. Description of the Related Art

Each wireless communication device participating in wireless communications includes a built-in radio transceiver (i.e., receiver and transmitter) or is coupled to an associated radio transceiver. As is known to those skilled in the art, the transmitter typically includes a data modulation stage, one or more intermediate frequency stages, and a power amplifier. The data modulation stage converts raw data into baseband signals in accordance with a particular wireless communication standard. The intermediate frequency stages mix the baseband signals with one or more local oscillations to produce RF signals. The power amplifier amplifies the RF signals prior to transmission via an antenna.

The receiver is typically coupled to the antenna and includes a low noise amplifier, one or more intermediate frequency stages, a filtering stage, and a data recovery stage. The low noise amplifier receives, via the antenna, inbound RF signals and amplifies the inbound RF signals. The intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with a particular wireless communication standard.

Different wireless devices in a wireless communication system may be compliant with different standards or different variations of the same standard. For example, 802.11a an extension of the 802.11 standard, provides up to 54 Mbps in the 5 GHz band. 802.11b, another extension of the 802.11 standard, provides 11 Mbps transmission (with a fallback to 5.5, 2 and 1 Mbps) in the 2.4 GHz band. 802.11g, another extension of the 802.11 standard, provides 20+ Mbps in the 2.4 GHz band. 802.11n, a new extension of 802.11, is being developed to address, among other thins, higher throughput and compatibility issues. An 802.11a compliant communications device may reside in the same WLAN as a device that is compliant with another 802.11 standard. When devices that are compliant with multiple versions of the 802.11 standard are in the same WLAN, the devices that are compliant with older versions are considered to be legacy devices. To ensure backward compatibility with legacy devices, specific mechanisms must be employed to insure that the legacy devices know when a device that is compliant with a newer version of the standard is using a wireless channel to avoid a collision. New implementations of wireless communication protocol enable higher speed throughput, while also enabling legacy devices which might be only compliant with 802.11a or 802.11g to communicate in systems which are operating at higher speeds.

Devices implementing both the 802.11a and 802.11g standards use an orthogonal frequency division multiplexing (OFDM) encoding scheme. OFDM is a frequency division multiplexing modulation technique for transmitting large amounts of digital data over a radio wave. OFDM works by spreading a single data stream over a band of sub-carriers, each of which is transmitted in parallel. In 802.11a and 802.11g compliant devices, only 52 of the 64 active sub-carriers are used. Four of the active sub-carriers are pilot sub-carriers that the system uses as a reference to disregard frequency or phase shifts of the signal during transmission. The remaining 48 sub-carriers provide separate wireless pathways for sending information in a parallel fashion. The 52 sub-carriers are modulated using binary or quadrature phase shift keying (BPSK/QPSK), 16 Quadrature Amplitude Modulation (QAM), or 64 QAM. Therefore, 802.11a and 802.11g compliant devices use sub-carriers −26 to +26, with the 0-index sub-carrier set to 0 and 0-index sub-carrier being the carrier frequency. As such, only part of the 20 Mhz bandwidth supported by 802.11a and 802.11g is use.

In 802.11a/802.11g, each data packet starts with a preamble which includes a short training sequence followed by a long training sequence. The short and long training sequences are used for synchronization between the sender and the receiver. The long training sequence of 802.11a and 802.11g is defined such that each of sub-carriers −26 to +26, *except for the sub-carrier 0 which is set to 0,* has one BPSK [consellation] *constellation* point, either +1 or −1.

There exists a need to create a long training sequence of minimum peak-to-average ratio that uses more sub-carriers without interfering with adjacent channels. The inventive long [trains] *training* sequence with a minimum peak-to-average power ratio should be usable by legacy devices in order to estimate channel impulse response and to estimate carrier frequency offset between a transmitter and a receiver.

SUMMARY OF THE INVENTION

According to one aspect of the invention, there is provided a network device for generating an expanded long training sequence with a minimal peak-to-average ratio. The network device includes a signal generating circuit for generating the expanded long training sequence. The network device also includes an Inverse Fourier Transform for processing the expanded long training sequence from the signal generating circuit and producing an optimal expanded long training sequence with a minimal peak-to-average ratio. The expanded long training sequence and the optimal expanded long training sequence are stored on more than 52 sub-carriers.

According to another aspect of the invention, there is provided a network device for generating an expanded long training sequence with a minimal peak-to-average ratio. The network device includes a signal generating circuit for generating the expanded long training sequence. The network device also includes an Inverse Fourier Transform for processing the expanded long training sequence from the signal generating circuit and producing an optimal expanded long training sequence with a minimal peak-to-average ratio. The expanded long training sequence and the optimal expanded long training sequence are stored on more than 56 sub-carriers.

According to another aspect of the invention, there is provided a network device for generating an expanded long training sequence with a minimal peak-to-average ratio. The network device includes a signal generating circuit for generating the expanded long training sequence. The network device also includes an Inverse Fourier Transform for processing the expanded long training sequence from the signal generating circuit and producing an optimal expanded long training sequence with a minimal peak-to-average ratio. The expanded long training sequence and the optimal expanded long training sequence are stored on more than 63 sub-carriers.

According to another aspect of the invention, there is provided a method for generating an expanded long training sequence with a minimal peak-to-average ratio. The method includes the steps of generating the expanded long training sequence and producing an optimal expanded long training sequence with a minimal peak-to-average ratio. The method also includes the step of storing the expanded long training sequence and the optimal expanded long training sequence on more than 52 sub-carriers

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention, wherein:

FIG. 4 illustrates the long training sequence that is used in 56 active sub-carriers; and FIG. 5 illustrates the long training sequence that is used in 63 active sub-carriers.

DETAILED DESCRIPTION OF THE INVENTION

Reference will now be made to the preferred embodiments of the present invention, examples of which are illustrated in the accompanying drawings.

Figure 1:
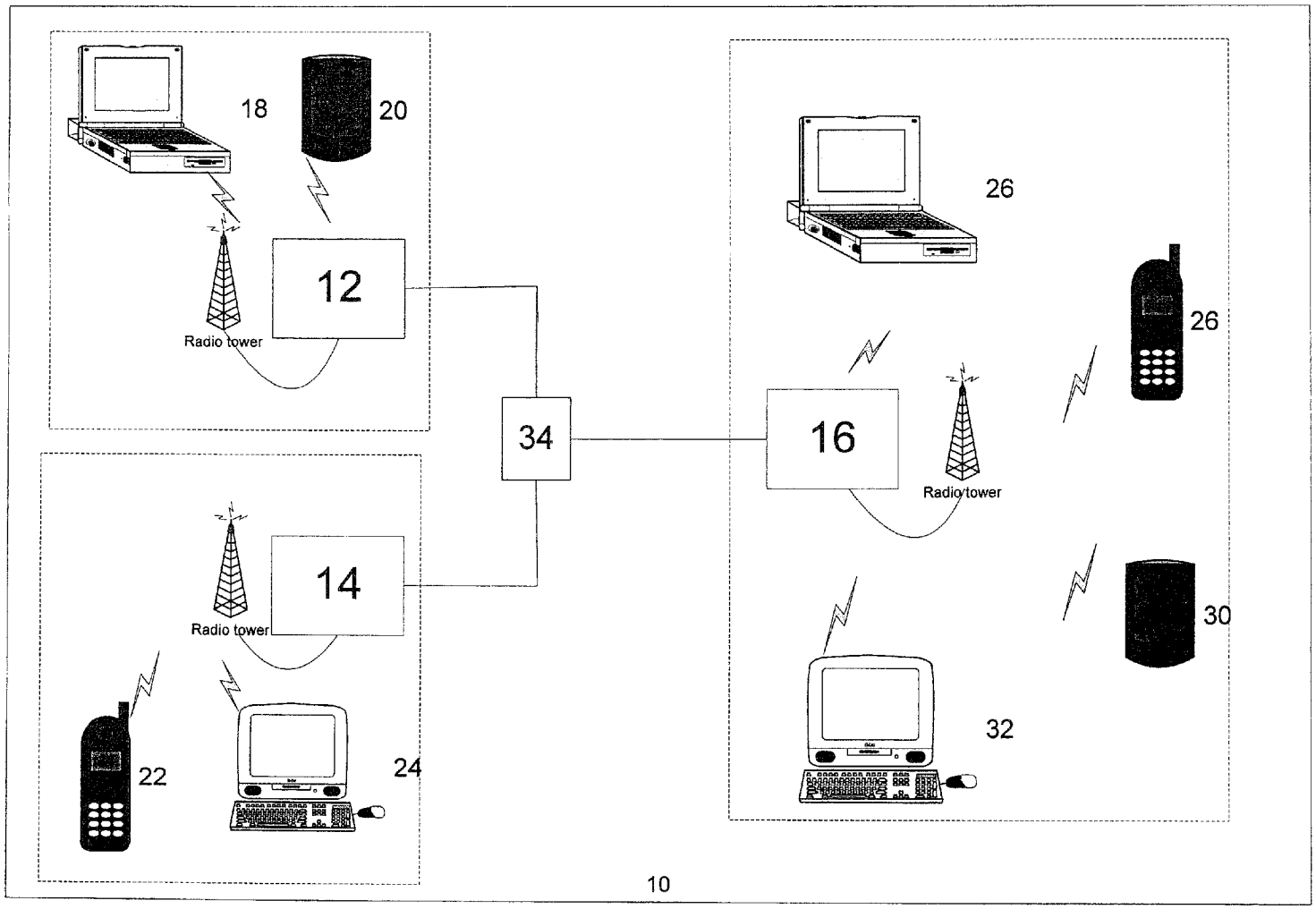
FIG. 1 illustrates a communication system that includes a plurality of base stations, a plurality of wireless communication devices and a network hardware component.

FIG. 1 illustrates a communication system 10 that includes a plurality of base stations and/or access points 12-16, a plurality of wireless communication devices 18-32 and a network hardware component 34. Wireless communication devices 18-32 may be laptop computers 18 and 26, personal digital assistant hosts 20 and 30, personal computer 24 and 32 and/or cellular telephone 22 and 28. Base stations or access points 12-16 are operably coupled to network hardware 34 via local area network connections 36, 38 and 40. Network hardware 34, for example a router, a switch, a bridge, a modem, or a system controller, provides a wide area network connection for communication system 10. Each of base stations or access points 12-16 has an associated antenna or antenna array to communicate with the wireless communication devices in its area. Typically, the wireless communication devices register with a particular base station or access point 12-14 to receive services from communication system 10. Each wireless communication device includes a built-in radio or is coupled to an associated radio. The radio includes at least one radio frequency (RF) transmitter and at least one RF receiver.

The present invention provides an expanded long training sequence of minimum peak-to-average power ratio and thereby decreases power back-off. The inventive expanded long training sequence may be used by 802.11a or 802.11g devices for estimating the channel impulse response and by a receiver for estimating the carrier frequency offset between the transmitter clock and receiver clock. The inventive expanded long training sequence is usable by 802.11a or 802.11g systems only if the values at sub-carriers −26 to +26 are identical to those of the current long training sequence used in 802.11a and 802.11g systems. As such, the invention [utilized] *utilizes* the same +1 or −1 binary phase shift key (BPSK) encoding for each new sub-carrier and the long training sequence of 802.11a or 802.11g systems is maintained in the present invention.

In a first embodiment of the invention, the expanded long training sequence is implemented in 56 active sub-carriers including sub-carriers −28 to +28 *except the 0-index sub-carrier which is set to 0*. In another embodiment, an expanded long training sequence is implemented using 63 active sub-carriers, i.e., all of the active sub-carriers (−32 to +31) except the 0-index sub-carrier which is set to 0. In both embodiments of the invention, orthogonality is not affected, since a 64-point orthogonal transform is used to generate the time-domain sequence. Additionally, the output of an auto-correlator for computing the carrier frequency offset is not affected by the extra sub-carriers.

Figure 2:
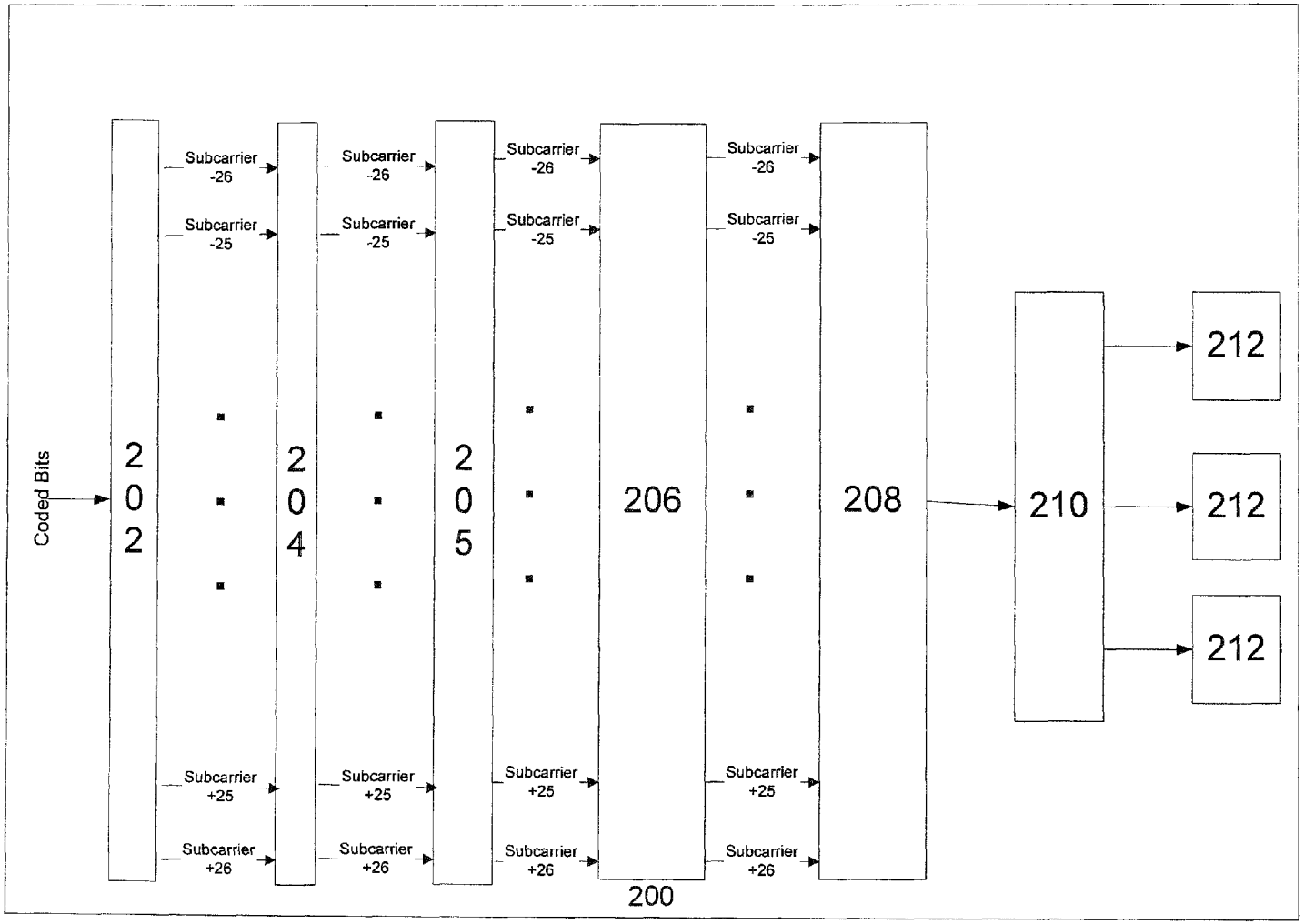
FIG. 2 illustrates a schematic block diagram of a processor that is configured to generate an expanded long training sequence.

FIG. 2 illustrates a schematic block diagram of a processor that is configured to generate an expanded long training sequence. Processor 200 includes a symbol mapper 202, a frequency domain window 204, a signal generating circuit 205, an inverse [fast] Fourier transform [(IFFT)] module 206, a [serial to] parallel *to serial* module 208, a digital transmit filter and/or time domain window module 210, and digital to analog converters (D/A) 212. For an expanded long training sequence, symbol mapper 202 generates symbols from the coded bits for each of the 64 subcarriers of an OFDM sequence. Frequency domain window 204 applies a weighting factor on each subcarrier. Signal generating circuit 205 generates the expanded long training sequence and if 56 active sub-carriers are being used, signal generating circuit generates the expanded long training sequence and stores the expanded long training sequence in sub-carriers −28 to +28 *except the 0-index sub-carrier which is set to 0*. If 63 active sub-carriers are being used, signal generating circuit generates the expanded long training sequence and stores the expanded long training sequence in sub-carriers −32 to +32 i.e., all of the active sub-carriers (−32 to +31) except the 0-index sub-carrier which is set to 0. The inventive long training sequence is inputted into an Inverse Fourier Transform 206. The invention uses the same +1 or −1 BPSK encoding for each new sub-carrier. Inverse Fourier Transform 206 may be an inverse Fast Fourier Transform (IFFT) or Inverse Discrete Fourier Transform [(IFDT)] (*IDFT*). Inverse Fourier Transform 206 processes the long training sequence from signal generating circuit 205 and thereafter produces an optimal expanded long training sequence with a minimal peak-to-average power ratio. The optimal expanded long training sequence may be used in either 56 active sub-carriers or 63 active subscribers. [Serial to parallel] *Parallel to serial* module 208 converts the [serial] *parallel* time domain signals *from the Inverse Fourier Transform 206* into [parallel] *serial* time domain signals that are subsequently filtered and converted to analog signals via the D/A.

Figure 3:
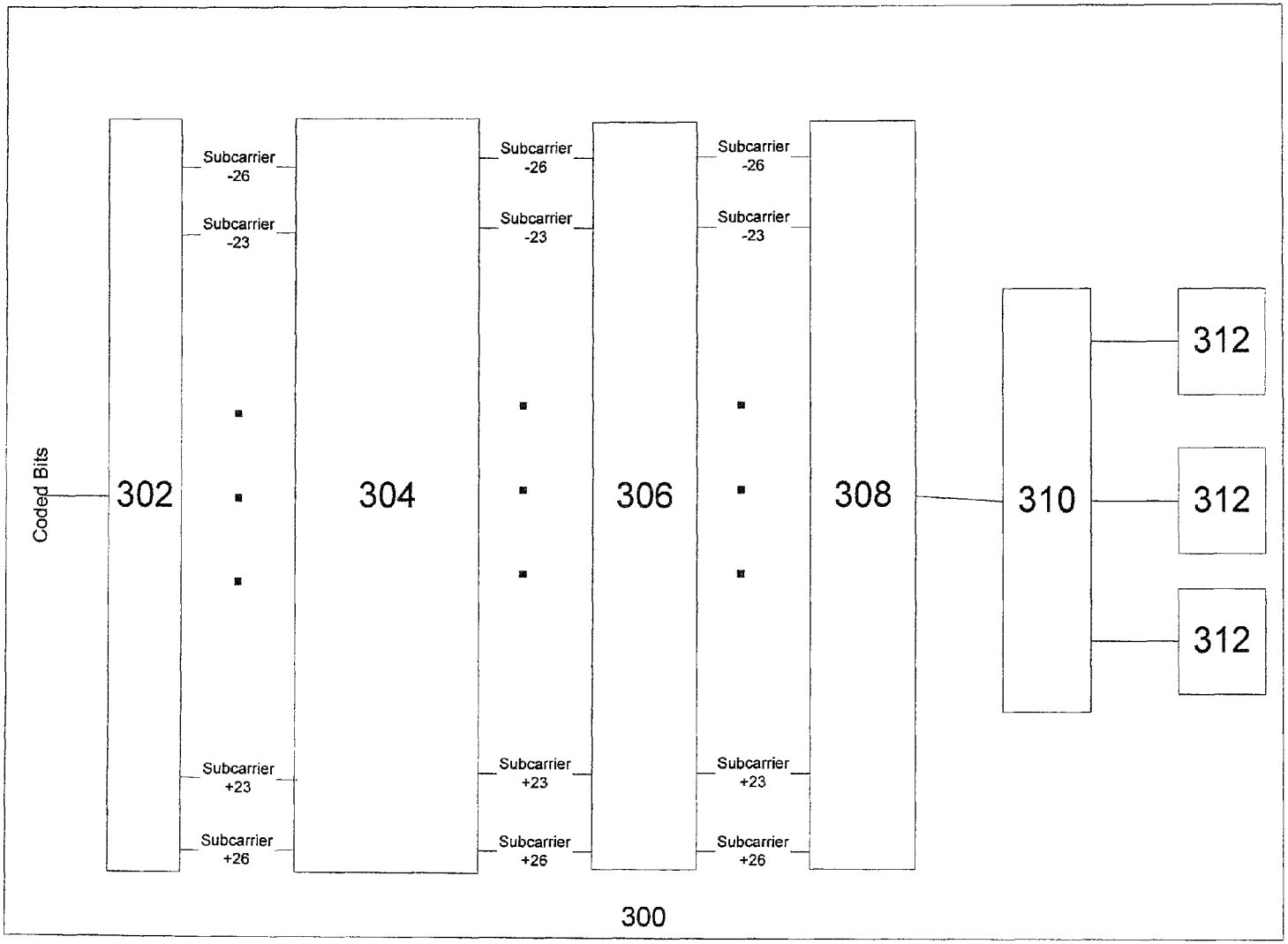
FIG. 3 is a schematic block diagram of a processor that is configured to process an expanded long training sequence.

FIG. 3 is a schematic block diagram of a processor that is configured to process an expanded long training sequence. Processor 300 includes a symbol demapper 302, a frequency domain window 304, a fast Fourier transform (FFT) module 306, a [parallel to] serial *to parallel* module 308, a digital receiver filter and/or time domain window module 310, and analog to digital converters (A/D) 312. A/D converters 312 convert the sequence into digital signals that are filtered via digital receiver filter 310. [Parallel to serial] *Serial to parallel* module 308 converts the digital time domain signals into a plurality of [serial] time domain signals. FFT module 306 converts the [serial] time domain signals into frequency domain signals. Frequency domain window 304 applies a weighting factor on each frequency domain signal. Symbol demapper 302 generates the coded bits from each of the 64 subcarriers of an OFDM sequence received from the frequency domain window.

FIG. 4 illustrates the long training sequence with a minimum peak-to-average power ratio that is used in 56 active sub-carriers. Out of the 16 possibilities for the four new sub-carrier positions, the sequence illustrated in FIG. 4 has the minimum peak-to-average power ratio, i.e., a peak-to-average power ratio of 3.6 dB.

FIG. 5 illustrates the long training sequence with a minimum peak-to-average power ratio that is used in 63 active sub-carriers. Out of the 2048 possibilities for the eleven new sub-carrier positions, the sequence illustrated in FIG. 5 has the minimum peak-to-average power ratio, i.e., a peak-to-average power ratio of 3.6 dB.

It should be appreciated by one skilled in art, that the present invention may be utilized in any device that implements the OFDM encoding scheme. The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

[1. A wireless communications device, comprising:

a signal generator that generates an extended long training sequence; and an Inverse Fourier Transformer operatively coupled to the signal generator, wherein the Inverse Fourier Transformer processes the extended long training sequence from the signal generator and provides an optimal extended long training sequence with a minimal peak-to-average ratio, and wherein at least the optimal extended long training sequence is carried by a greater number of subcarriers than a standard wireless networking configuration for an Orthogonal Frequency Division Multiplexing scheme.]

[2. The wireless communications device according to claim 1, wherein at least the optimal extended long training sequence is carried by at least 56 active sub-carriers.]

[3. The wireless communications device according to claim 2, wherein the at least 56 active sub-carriers correspond to at least indexed sub-carriers −28 to +28.]

[4. The wireless communications device according to claim 2, wherein the optimal extended long training sequence has a minimum peak-to-average power ratio of 3.6 dB.]

[5. The wireless communications device according to claim 1, wherein at least the optimal extended long training sequence is carried by at least 63 active sub-carriers.]

[6. The wireless communications device according to claim 5, wherein the at least 63 active sub-carriers correspond to at least indexed sub-carriers −32 to +31.]

[7. The wireless communications device according to claim 5, wherein the optimal extended long training sequence has a minimum peak-to-average power ratio of 3.6 dB.]

[8. The wireless communications device according to claim 1, wherein a binary phase shift key encoding is used for each sub-carrier above the +26 indexed sub-carrier and below the −26 indexed sub-carrier.]

[9. The wireless communications device according to claim 1, wherein the Inverse Fourier Transformer comprises at least one of the following: an Inverse Fast Fourier Transformer and an Inverse Discrete Fourier Transformer.]

[10. The wireless communications device according to claim 1, wherein the wireless communications device comprises one or more of the following: a personal digital assistant, a laptop computer, a personal computer and a cellular phone.]

[11. The wireless communications device according to claim 1, wherein the wireless communications device comprises a wireless mobile communications device.]

[12. The wireless communications device according to claim 1, wherein the wireless communications device comprises one or more of the following: an access point and a base station.]

[13. The wireless communications device according to claim 1, wherein the wireless communications device is backwards compatible with legacy wireless local area network devices.]

[14. The wireless communications device according to claim 1, wherein the optimal extended long training sequence is longer than a long training sequence used by a legacy wireless local area network device in accordance with a legacy wireless networking protocol standard.]

[15. The wireless communications device according to claim 14, wherein the legacy wireless local area network device uses the optimal extended long training sequence to estimate a carrier frequency offset even though the optimal extended long training sequence is longer than the long training sequence that is specified by the legacy wireless networking protocol standard.]

[16. The wireless communications device according to claim 15, wherein the long training sequence that is specified by the legacy wireless networking protocol standard is maintained in the extended long training sequence or the optimal extended long training sequence.]

[17. The wireless communications device according to claim 1, wherein the wireless communications device decreases power back-off.]

[18. The wireless communications device according to claim 1, wherein the wireless communications device registers with one or more of the following: an access point and a base station.]

[19. The wireless communications device according to claim 1, wherein the extended long training sequence or the optimal extended long training sequence is encoded using binary phase shift key encoding on each of the subcarriers.]

[20. The wireless communications device according to claim 1, comprising:

a symbol mapper operatively coupled to the signal generator, wherein the symbol mapper receives coded bits and generates symbols for each of 64 subcarriers of an Orthogonal Frequency Division Multiplexing sequence.]

*21. A wireless communications device, comprising:*

*a signal generator that generates an extended long training sequence; and*

*an Inverse Fourier Transformer operatively coupled to the signal generator,*

*wherein the Inverse Fourier Transformer processes the extended long training sequence from the signal generator and provides an optimal extended long training sequence with a minimal peak-to-average ratio, and*

*wherein at least the optimal extended long training sequence is carried by a greater number of subcarriers than a standard wireless networking configuration for an Orthogonal Frequency Division Multiplexing scheme, and*

*wherein the optimal extended long training sequence includes (i) standard encodings for a training sequence for the subcarriers of the standard wireless networking configuration and (ii) one or more encodings for one or more additional subcarriers of the optimal extended long training sequence that are different from the subcarriers of the standard wireless networking configuration.*

*22. The wireless communications device according to claim 21, wherein at least the optimal extended long training sequence is carried by at least 56 active sub-carriers.*

*23. The wireless communications device according to claim 22, wherein the at least 56 active sub-carriers correspond to at least indexed sub-carriers −28 to +28.*

*24. The wireless communications device according to claim 22, wherein the optimal extended long training sequence has a minimum peak-to-average power ratio of 3.6 dB.*

*25. The wireless communications device according to claim 21, wherein at least the optimal extended long training sequence is carried by at least 63 active sub-carriers.*

*26. The wireless communications device according to claim 25, wherein the at least 63 active sub-carriers correspond to at least indexed sub-carriers −32 to +31.*

*27. The wireless communications device according to claim 25, wherein the optimal extended long training sequence has a minimum peak-to-average power ratio of 3.6 dB.*

*28. The wireless communications device according to claim 21, wherein a binary phase shift key encoding is used for each sub-carrier above the +26 indexed sub-carrier and below the −26 indexed sub-carrier.*

*29. The wireless communications device according to claim 21, wherein the Inverse Fourier Transformer comprises at least one of the following: an Inverse Fast Fourier Transformer and an Inverse Discrete Fourier Transformer.*

*30. The wireless communications device according to claim 21, wherein the wireless communications device comprises one or more of the following: a personal digital assistant, a laptop computer, a personal computer and a cellular phone.*

*31. The wireless communications device according to claim 21, wherein the wireless communications device comprises a wireless mobile communications device.*

*32. The wireless communications device according to claim 21, wherein the wireless communications device comprises one or more of the following: an access point and a base station.*

*33. The wireless communications device according to claim 21, wherein the wireless communications device is backwards compatible with legacy wireless local area network devices.*

*34. The wireless communications device according to claim 21, wherein the optimal extended long training sequence is longer than a long training sequence used by a legacy wireless local area network device in accordance with a legacy wireless networking protocol standard.*

*35. The wireless communications device according to claim 34, wherein the legacy wireless local area network device uses the optimal extended long training sequence to estimate a carrier frequency offset even though the optimal extended long training sequence is longer than the long training sequence that is specified by the legacy wireless networking protocol standard.*

*36. The wireless communications device according to claim 35, wherein the long training sequence that is specified by the legacy wireless networking protocol standard is maintained in the extended long training sequence or the optimal extended long training sequence.*

*37. The wireless communications device according to claim 21, wherein the wireless communications device decreases power back-off.*

*38. The wireless communications device according to claim 21, wherein the wireless communications device registers with one or more of the following: an access point and a base station.*

*39. The wireless communications device according to claim 21, wherein the extended long training sequence or the optimal extended long training sequence is encoded using binary phase shift key encoding on each of the subcarriers.*

*40. The wireless communications device according to claim 21, comprising:*

*a symbol mapper operatively coupled to the signal generator, wherein the symbol mapper receives coded bits and generates symbols for each of 64 subcarriers of an Orthogonal Frequency Division Multiplexing sequence.*

*41. The wireless communications device according to claim 21, wherein the optimal extended long training sequence is carried by exactly 63 active sub-carriers.*

*42. The wireless communications device according to claim 41, wherein the optimal extended long training sequence is represented by encodings for indexed sub-carriers −32 to +31, excluding indexed sub-carrier 0 which is set to zero, as follows:*

| | | | | | | | | | | | | | |
|---|---|---|---|---|---|---|---|---|---|---|---|---|---|
| *Sub-carrier* | | | | | | | | −32 | −31 | −30 | −29 | −28 | −27 |
| *Encoding* | | | | | | | | −1 | −1 | +1 | +1 | +1 | +1 |
| *Sub-carrier* | −26 | −25 | −24 | −23 | −22 | −21 | −20 | −19 | −18 | −17 | −16 | −15 | −14 |
| *Encoding* | +1 | +1 | −1 | −1 | +1 | +1 | −1 | +1 | −1 | +1 | +1 | +1 | +1 |
| *Sub-carrier* | −13 | −12 | −11 | −10 | −9 | −8 | −7 | −6 | −5 | −4 | −3 | −2 | −1 |
| *Encoding* | +1 | +1 | −1 | −1 | +1 | +1 | −1 | +1 | −1 | +1 | +1 | +1 | +1 |
| *Sub-carrier* | 1 | 2 | 3 | 4 | 5 | 6 | 7 | 8 | 9 | 10 | 11 | 12 | 13 |
| *Encoding* | +1 | −1 | −1 | +1 | +1 | −1 | +1 | −1 | +1 | −1 | −1 | −1 | −1 |
| *Sub-carrier* | 14 | 15 | 16 | 17 | 18 | 19 | 20 | 21 | 22 | 23 | 24 | 25 | 26 |
| *Encoding* | −1 | +1 | +1 | −1 | −1 | +1 | −1 | +1 | −1 | +1 | +1 | +1 | +1 |
| *Sub-carrier* | 27 | 28 | 29 | 30 | 31 | | | | | | | | |
| *Encoding* | −1 | −1 | −1 | +1 | −1. | | | | | | | | |

*43. The wireless communications device according to claim 21, wherein:*

*the standard wireless networking configuration has 52 subcarriers comprising subcarriers −26 to −1 and +1 to +26; and*

*the one or more additional subcarriers of the optimal extended long training sequence comprise one or more subcarriers below subcarrier −26 and one or more subcarriers above subcarrier +26.*

*44. The wireless communications device according to claim 43, wherein encodings for the sub-carriers −26 to −1 and +1 to +26 are as follows:*

| | | | | | | | | | | | | | |
|---|---|---|---|---|---|---|---|---|---|---|---|---|---|
| *Sub-carrier* | −26 | −25 | −24 | −23 | −22 | −21 | −20 | −19 | −18 | −17 | −16 | −15 | −14 |
| *Encoding* | +1 | +1 | −1 | −1 | +1 | +1 | −1 | +1 | −1 | +1 | +1 | +1 | +1 |
| *Sub-carrier* | −13 | −12 | −11 | −10 | −9 | −8 | −7 | −6 | −5 | −4 | −3 | −2 | −1 |
| *Encoding* | +1 | +1 | −1 | −1 | +1 | +1 | −1 | +1 | −1 | +1 | +1 | +1 | +1 |
| *Sub-carrier* | 1 | 2 | 3 | 4 | 5 | 6 | 7 | 8 | 9 | 10 | 11 | 12 | 13 |
| *Encoding* | +1 | −1 | −1 | +1 | +1 | −1 | +1 | −1 | +1 | −1 | −1 | −1 | −1 |
| *Sub-carrier* | 14 | 15 | 16 | 17 | 18 | 19 | 20 | 21 | 22 | 23 | 24 | 25 | 26 |
| *Encoding* | −1 | +1 | +1 | −1 | −1 | +1 | −1 | +1 | −1 | +1 | +1 | +1 | +1. |

*45. The wireless communications device according to claim 43, wherein the one or more additional subcarriers of the optimal extended long training sequence consist of subcarriers −28, −27, +27, and +28.*

*46. The wireless communications device according to claim 21, wherein the optimal extended long training sequence is carried by exactly 56 active sub-carriers.*

*47. The wireless communications device according to claim 46, wherein the optimal extended long training sequence is represented by encodings for indexed sub-carriers −28 to +28, excluding indexed sub-carrier 0 which is set to zero, as follows:*

| | | | | | | | | | | | | | |
|---|---|---|---|---|---|---|---|---|---|---|---|---|---|
| *Sub-carrier* | | | | | | | | | | | | −28 | −27 |
| *Encoding* | | | | | | | | | | | | +1 | +1 |
| *Sub-carrier* | −26 | −25 | −24 | −23 | −22 | −21 | −20 | −19 | −18 | −17 | −16 | −15 | −14 |
| *Encoding* | +1 | +1 | −1 | −1 | +1 | +1 | −1 | +1 | −1 | +1 | +1 | +1 | +1 |
| *Sub-carrier* | −13 | −12 | −11 | −10 | −9 | −8 | −7 | −6 | −5 | −4 | −3 | −2 | −1 |
| *Encoding* | +1 | +1 | −1 | −1 | +1 | +1 | −1 | +1 | −1 | +1 | +1 | +1 | +1 |
| *Sub-carrier* | 1 | 2 | 3 | 4 | 5 | 6 | 7 | 8 | 9 | 10 | 11 | 12 | 13 |
| *Encoding* | +1 | −1 | −1 | +1 | +1 | −1 | +1 | −1 | +1 | −1 | −1 | −1 | −1 |
| *Sub-carrier* | 14 | 15 | 16 | 17 | 18 | 19 | 20 | 21 | 22 | 23 | 24 | 25 | 26 |
| *Encoding* | −1 | +1 | +1 | −1 | −1 | +1 | −1 | +1 | −1 | +1 | +1 | +1 | +1 |
| *Sub-carrier* | 27 | 28 | | | | | | | | | | | |
| *Encoding* | −1 | −1. | | | | | | | | | | | |

*48. The wireless communications device according to claim 21, wherein at least one output of the Inverse Fourier Transformer is operatively coupled to at least one digital-to-analog converter.*

*49. The wireless communications device according to claim 21, wherein at least one output of the Inverse Fourier Transformer is operatively coupled to multiple digital-to-analog converters.*

*50. The wireless communications device according to claim 21, wherein an input of the signal generator is operatively coupled to a frequency-domain windower.*

*51. The wireless communications device according to claim 21, wherein an output of the Inverse Fourier Transformer is operatively coupled to a time-domain windower.*

*52. The wireless communications device according to claim 51, wherein an output of the time-domain windower is operatively coupled to at least one digital-to-analog converter.*

*53. The wireless communication device according to claim 21, wherein an output of the Inverse Fourier Transformer is operatively coupled to a digital transmit filter.*

*54. The wireless communications device according to claim 21, wherein an output of the Inverse Fourier Transformer is operatively coupled to a parallel-to-serial convertor.*

*55. The wireless communications device according to claim 21, wherein the wireless communications device is configured to convert parallel frequency-domain signals into serial time-domain signals.*

* * * * *